(12) United States Patent  (10) Patent No.: US 8,735,775 B2
Kaufman  (45) Date of Patent: May 27, 2014

(54) HYBRID WIRE FEEDER SYSTEMS AND METHODS

(75) Inventor: Charles Lyle Kaufman, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 769 days.

(21) Appl. No.: 12/727,358

(22) Filed: Mar. 19, 2010

(65) Prior Publication Data

US 2010/0314375 A1    Dec. 16, 2010

Related U.S. Application Data

(60) Provisional application No. 61/186,195, filed on Jun. 11, 2009.

(51) Int. Cl.
 *B23K 9/09* (2006.01)
 *B23K 9/10* (2006.01)
 *B23K 9/12* (2006.01)

(52) U.S. Cl.
 USPC .............................. 219/137 PS; 219/130.01

(58) Field of Classification Search
 USPC ................. 219/130.1, 132–134, 136–137 PS
 See application file for complete search history.

(56) References Cited

U.S. PATENT DOCUMENTS

| 6,225,596 | B1 * | 5/2001 | Chandler et al. ........... 219/130.1 |
| 8,080,761 | B2 * | 12/2011 | Matthews et al. .......... 219/130.1 |
| 2003/0217998 | A1 * | 11/2003 | Reynolds et al. ....... 219/137 PS |
| 2005/0263514 | A1 * | 12/2005 | Albrecht ....................... 219/133 |
| 2007/0080154 | A1 * | 4/2007 | Ott et al. ....................... 219/132 |
| 2007/0187376 | A1 | 8/2007 | Albrecht |
| 2009/0057285 | A1 * | 3/2009 | Bashore et al. ............ 219/130.1 |

* cited by examiner

*Primary Examiner* — Harry W Byrne
*Assistant Examiner* — Lance Reidlinger
(74) *Attorney, Agent, or Firm* — Fletcher Yoder P.C.

(57) ABSTRACT

A hybrid wire feeder including an energy storage device and a charging circuit are provided. The hybrid wire feeder may selectively alternate between utilization of power from the energy storage device and utilization of power from a welding power supply to power the weld and one or more weld sequencing events. Some embodiments provide for the energy storage device to be adapted to discharge during periods when the welding power supply is not outputting power and to recharge from the welding power when the welding power supply is outputting power.

20 Claims, 4 Drawing Sheets

HYBRID WIRE FEEDER SYSTEMS AND METHODS

CROSS REFERENCE TO RELATED APPLICATIONS

This application is a Non-Provisional patent application of U.S. Provisional Patent Application No. 61/186,195, entitled "Hybrid Wire Feeder", filed Jun. 11, 2009, which is herein incorporated by reference.

BACKGROUND

The invention relates generally to welding systems, and, more particularly, to a hybrid wire feeder for use in a welding system.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch.

Oftentimes, such wire feeders rely on the welding power supply output to power wire feeder operations, such as wire jogs, gas purges, display power, and so forth. Unfortunately, such an arrangement requires the welding power supply to remain active during non-welding periods (e.g., standby periods, periods prior to weld initiation, etc.) to ensure the power demands of the wire feeder are met. Furthermore, since the wire feeder often relies on the welding power source for energy, the wire feeder is typically configured to function solely with power supplies of the same brand. Such features limit the efficiency and utility of traditional wire feeders. Accordingly, there exists a need for wire feeder systems that overcome these drawbacks.

BRIEF DESCRIPTION

In an exemplary embodiment, a welding system includes a welding power supply configured to provide welding power for a welding operation. The welding power supply also includes a wire feeder including an energy storage device and a charging circuit. When the welding power supply is not providing welding power, the wire feeder is configured to utilize power from the energy storage device to power weld sequencing events. Alternatively, when the welding power supply is providing welding power, the wire feeder is configured to utilize the charging circuit to charge the energy storage device with the welding power and to utilize the welding power to power the weld sequencing events.

In another exemplary embodiment, a wire feeder includes an energy storage device configured to provide energy to power one or more weld sequencing events when the wire feeder is not receiving weld power from a welding power source. The wire feeder also includes a charging circuit coupled to the energy storage device and configured to supply power to the energy storage device from the weld power when the wire feeder is receiving weld power from the welding power source. The wire feeder also includes a control circuit configured to activate discharge of power from the energy storage device when the wire feeder is not receiving weld power from the welding power source and to activate charging of the energy storage device when the wire feeder is receiving power from the welding power source.

In a further embodiment, a control circuit for a wire feeder is configured to discharge an energy storage device to provide energy to power one or more weld sequencing events when a welding power supply is not providing weld power and to charge an energy storage device with the weld power from the welding power supply when the welding power supply is providing weld power. The control circuit is also configured to utilize the weld power to power the one or more weld sequencing events when the welding power supply is providing weld power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a hybrid wire feeder including an energy storage device and a charging circuit are provided. The hybrid wire feeder is adapted to selectively alternate between utilization of power from the energy storage device and utilization of power from a welding power supply to power one or more weld sequencing events. That is, the hybrid wire feeder may utilize power from an energy storage device to provide power for weld sequencing events (e.g., wire jog, gas purging, etc.) before the welding power supply provides welding power. Accordingly, the energy storage device may be adapted to discharge during periods when the welding power supply is not outputting power. The energy storage device may be further adapted to recharge from the welding power when the welding power supply is outputting power. The energy storage device could also be recharged by solar or wind power in some embodiments. Still further, in certain embodiments, the hybrid wire feeder may utilize the energy storage device to power the welding arc prior to initiation of a power output from the welding power supply. The foregoing features may have the effect of reducing or eliminating delays in starting a welding process since initial weld sequencing events may be powered by the energy storage device.

Figure 1:
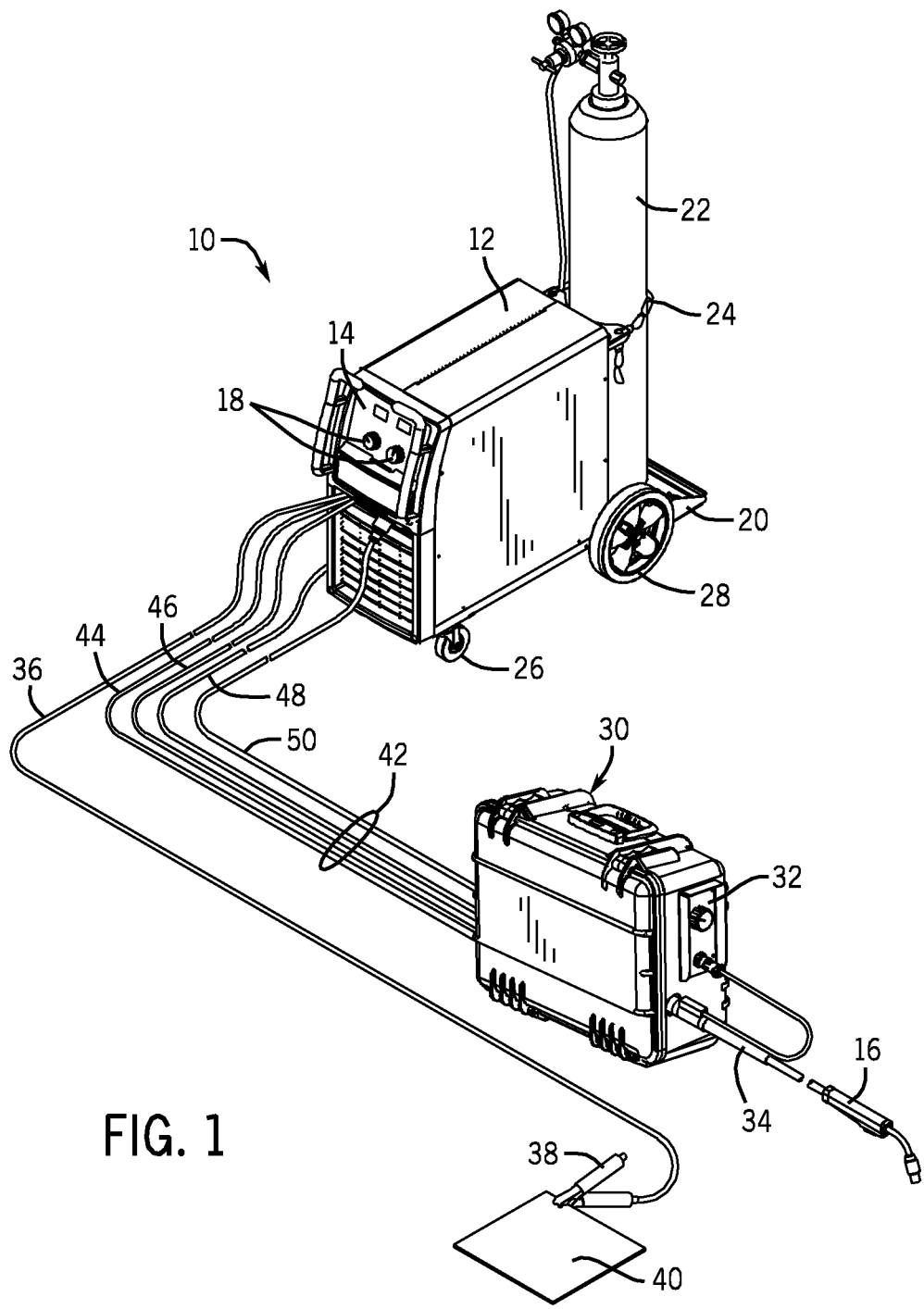
FIG. 1 is a perspective view of an exemplary welding power supply coupled to a hybrid wire feeder in accordance with aspects of the present invention.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a welding gun 16. To that end, the control panel 14 includes input or interface devices, such as knobs 18 that the operator may use to adjust welding parameters (e.g., voltage, current, etc.). The welder 12 may also include a tray 20 mounted on a back of the welder 12 and configured to support a gas cylinder 22 held in place with a chain 24. The gas cylinder 22 is the source of the gas that supplies the welding gun 16. Furthermore, the welder 12 may be portable via a set of smaller front wheels 26 and a set of larger back wheels 28, which enable the operator to move the welder 12 to the location of the weld.

The welding system 10 also includes a hybrid wire feeder 30 that provides welding wire to the welding gun 16 for use in the welding operation. The hybrid wire feeder 30 may include a control panel 32 that allows the user to set one or more wire feed parameters, such as wire feed speed. Additionally, the hybrid wire feeder 30 may house a variety of internal components, such as a wire spool, a wire feed drive system, a motor, and so forth. In presently contemplated embodiments, the hybrid wire feeder 30 may also house a battery and a battery charger configured to cooperate with the power provided for establishing and/or maintaining the welding arc to provide power for the wire feeder operations. That is, the hybrid wire feeder 30 is adapted to selectively draw power from the battery and the welding arc. For example, the wire feeder 30 may draw power from the battery during the initial sequencing of gas flow and wire feed when the welding power has not yet begun. Once the welding power begins to flow, the welding power may be the source of power for subsequent gas flow and wire feed operations, and the battery may recharge from the welding power. In this way, embodiments of the present invention utilize the hybrid nature of the wire feeder 30 to meet the needs of the welding operation before, during, and after the welding power is supplied.

It should be noted that the term "battery", energy storage device, or any term of similar import, as used herein refers to any device capable of selective energy storage and dissipation. For example, in certain embodiments, such devices may include liquid or dry cell chemical batteries (based upon any suitable materials or configuration), but may also or instead include one or more capacitors, a fuel cell, a solar cell, and so forth. Additionally, the hybrid wire feeder may be used with any wire feeding process, such as gas operations (gas metal arc welding (GMAW)) or gasless operations (shielded metal arc welding (SMAW)). For example, the hybrid wire feeder may be used in metal inert gas (MIG) welding or stick welding.

A variety of cables couple the components of the welding system 10 together and facilitate the supply of welding materials to the welding gun 16. A first cable 34 couples the welding gun 16 to the wire feeder 30. A second cable 36 couples the welder 12 to a work clamp 38 that connects to a workpiece 40 to complete the circuit between the welder 12 and the welding gun 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a control cable 50. Depending on the polarity of the welding process, the feeder power lead 44 connects to the same weld terminal as the cable 36. It should be noted that the bundle 42 of cables may not be bundled together in some embodiments.

It should be noted that modifications to the exemplary welding system 10 of FIG. 1 may be made in accordance with aspects of the present invention. For example, the tray 20 may be eliminated from the welder 12 and the gas cylinder 22 may be located on an auxiliary support cart or in a location remote from the welding operation. Furthermore, although the illustrated embodiments are described in the context of a constant voltage MIG welding process, the features of the invention may be utilized with a variety of other suitable welding systems and processes.

Figure 2:
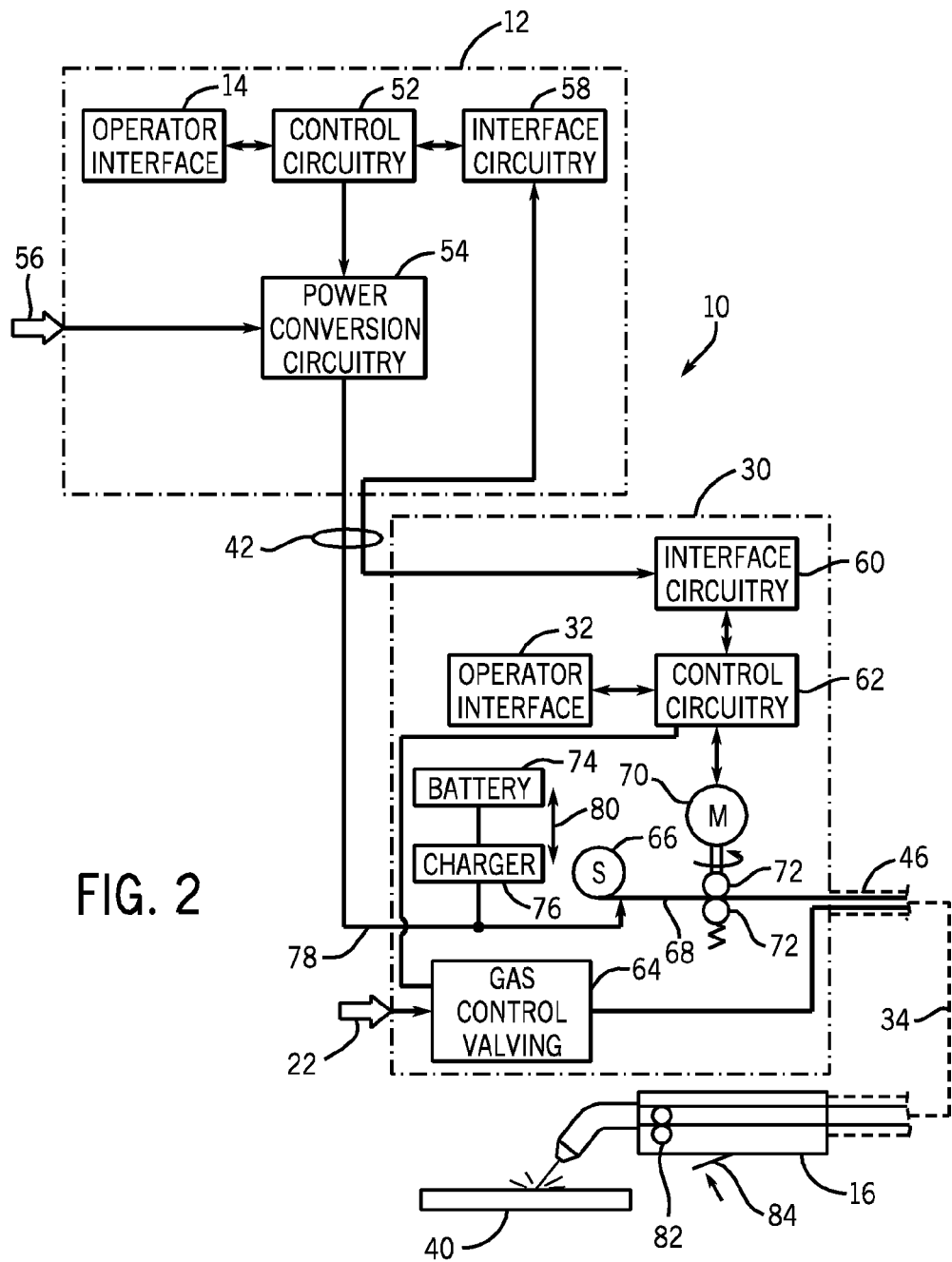
FIG. 2 is a block diagram illustrating exemplary functional components of the welding power supply and the hybrid wire feeder of FIG. 1.

FIG. 2 is a block diagram illustrating internal components of the welder 12 and the wire feeder 30. As before, the welder 12 and the wire feeder 30 are coupled to one another via the bundle 42 of cables, and the welding gun 16 is coupled to the wire feeder 30 via cable 34. As illustrated, the welder 12 includes the operator interface 14 that allows for data settings to be selected by the operator. The operator interface 14 may allow for selection of settings such as the weld process, the type of wire to be used, voltage and current settings, and so forth. In particular, the system is designed to allow for MIG welding with aluminum or other welding wire that is both pushed towards the torch 16 and pulled through the torch 16. These weld settings are communicated to control circuitry 52 within the power supply 12.

The control circuitry 52 operates to control generation of welding power output that is applied to the welding wire for carrying out the desired welding operation. The control circuitry 52 is coupled to power conversion circuitry 54. This power conversion circuitry 54 is adapted to create the output power that will ultimately be applied to the welding wire at the torch 16. Various power conversion circuits may be employed, including choppers, boost circuitry, buck circuitry, inverters, converters, and so forth. The configuration of such circuitry may be of types generally known in the art. The power conversion circuitry 54 is coupled to a source of electrical power as indicated by arrow 56. The power applied to the power conversion circuitry 54 may originate in the power grid, although other sources of power may also be used, such as power generated by an engine-driven generator, batteries, fuel cells or other alternative sources. Finally, the welder 12 illustrated in FIG. 2 includes interface circuitry 58 designed to allow the control circuitry 52 to exchange signals with the wire feeder 30.

The wire feeder 30 also includes interface circuitry 60 that is coupled to the interface circuitry 58 in the power supply 12. In some embodiments, multi-pin interfaces may be provided on both components and a multi-conductor cable run between the interface circuitry to allow for such information as wire feed speeds, processes, selected currents, voltages or power levels, and so forth to be set on either the power supply 12, the wire feeder 30, or both.

The wire feeder 12 also includes control circuitry 62 coupled to the interface circuitry 60. The control circuitry 62 allows for wire feed speeds to be controlled in accordance with operator selections, and permits these settings to be fed back to the power supply 12 via the interface circuitry 60. The control circuitry 62 is further coupled to the operator interface 32 on the wire feeder 30 that allows selection of one or more welding parameters, particularly wire feed speed. The operator interface 32 may also allow for selection of such weld parameters as the process, the type of wire utilized, current, voltage or power settings, and so forth. The control circuitry 62 is also coupled to gas control valving 64, which regulates the flow of shielding gas to the torch 16. In general, such gas is provided at the time of welding, and may be turned on immediately preceding the weld and for a short time following the weld.

The wire feeder 30 also includes components for feeding wire to the welding torch 16 and thereby to the welding application, under the control of control circuitry 62. For example, one or more spools 66 of welding wire 68 are housed in the wire feeder 30. Welding wire 68 is unspooled from the spools 66 and is progressively fed to the torch 16. A feed motor 70 is provided that engages with feed rollers 72 to push wire from the wire feeder towards the torch. In practice, one of the rollers 72 is mechanically coupled to the motor 70 and is rotated by the motor to drive the wire from the wire feeder, while the mating roller is biased towards the wire to maintain good contact between the two rollers and the wire. Some systems may include multiple rollers of this type.

The hybrid wire feeder 30 also includes a battery 74 and a charger 76 that interfaces with cable 78. During operation, the battery 74 may be accessed to power welding events, such as initial wire feed, gas pre-flow, and so forth, prior to the flow of welding arc power through cable 78 or after such flow has ceased. While the welding arc power is flowing, the wire feeder 30 may utilize the welding arc power to power the wire feed and to recharge the battery 74. In this way, the charger 76 may facilitate the bidirectional exchange of power between the battery 74 and the power cable 78, as indicated by arrow 80. Such a system may offer distinct advantages over non-hybrid wire feeders. For example, such systems may reduce or eliminate delays in starting the welding process since the battery may be used to power initial welding events. For further example, the battery may be used to provide power for welding operations during standby times (e.g., between welds). Still further, such a system enables the use of non-welding functions of the wire feeder, such as gas purging and wire jogging, without the need for welding power.

Power from the power supply 12 is applied to the wire, typically by means of the welding cable 46, in a conventional manner. Similarly, shielding gas is fed through the wire feeder and the welding cable 46. During welding operations, the wire is advanced through the welding cable jacket towards the torch 16. Within the torch, an additional pull motor 82 may be provided with an associated drive roller. The motor 82 is regulated to provide the desired wire feed speed. A trigger switch 84 on the torch provides a signal that is fed back to the wire feeder and then back to the power supply to enable the welding process to be started and stopped by the operator. That is, upon depression of the trigger switch, gas flow is begun, wire is advanced, power is applied to the welding cable 46 and through the torch to the advancing welding wire.

Figure 3:
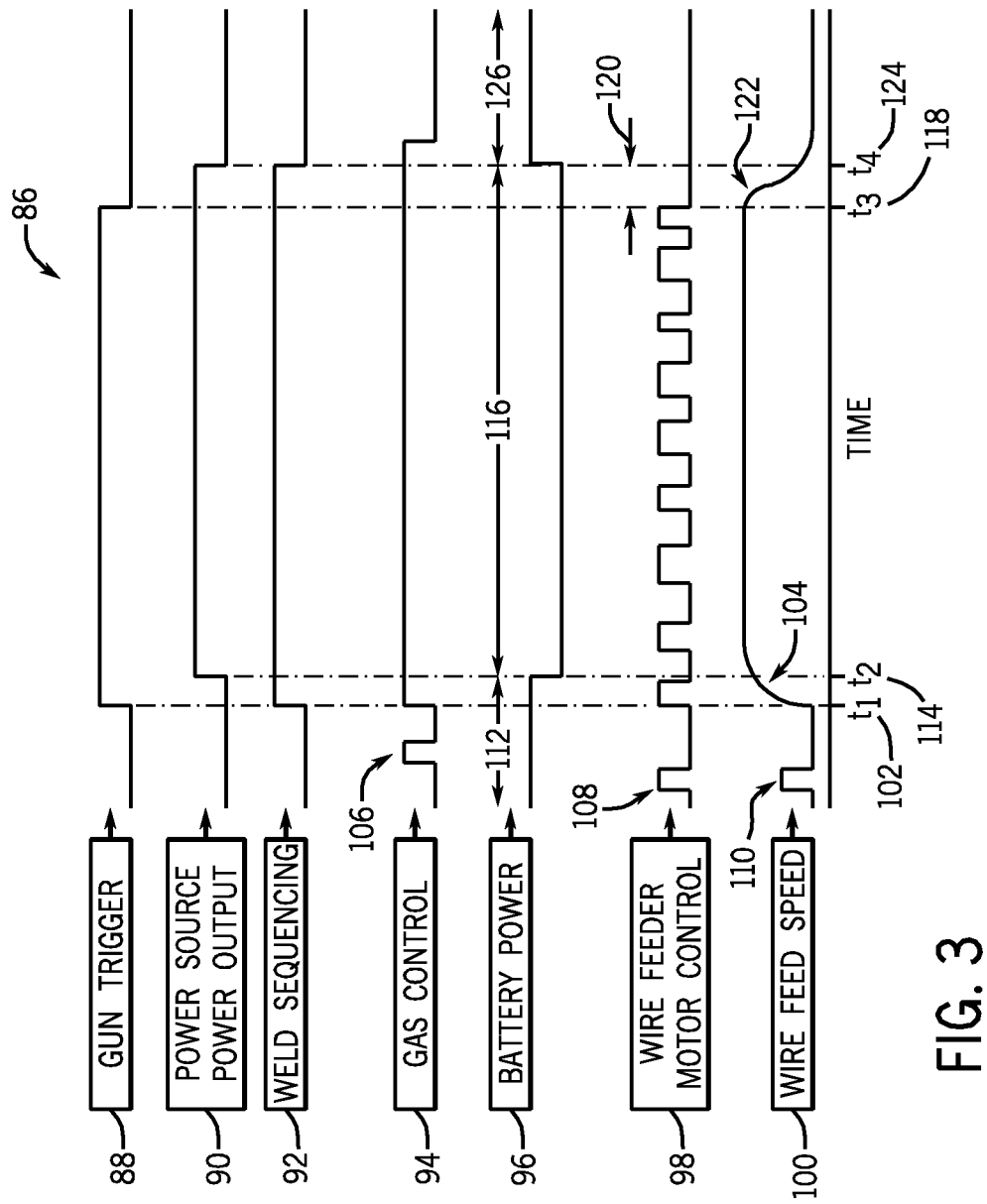
FIG. 3 is an exemplary timing diagram that may be generated during operation of an embodiment of the hybrid wire feeder of FIG. 1.

FIG. 3 illustrates an exemplary timing diagram 86 that may be generated during operation of an embodiment of the hybrid wire feeder, which is powered by both the battery and the welding arc power. The timing diagram 86 includes a gun trigger plot 88, a power source power output plot 90, a weld sequencing plot 92, a gas control plot 94, a battery power plot 96, a wire feeder motor control plot 98, and a wire feed speed plot 100. Together, the plots illustrate the timing of various functions and events as the hybrid wire feeder selectively uses power from the battery, uses power from the welding arc power, and utilizes the welding arc power to recharge the battery.

As shown, at a first time 102, the gun trigger is depressed, as shown in the gun trigger plot 88, and weld sequencing begins, as shown in the weld sequencing plot 92. Also at the first time 102, the wire feeder motor control is activated, as shown in plot 98, and the wire feed speed increases during portion 104 of the wire feed speed plot 100. However, before the gun trigger is depressed activating this sequence of events, a variety of pre-weld events powered by the battery may occur. Such pre-weld events may be triggered by events other than the gun trigger depression. For example, the welding operator may change the gas cylinder, which requires a gas purge 106, as shown in the gas control plot 94. In such an instance, the hybrid wire feeder utilizes the battery to power the activation of the gas valve. For further example, the welding operator may change the wire spool, which requires a wire jog 108 and an increase in wire feed speed 110, as shown in plots 98 and 100. Such events will also be powered by the battery, since welding has not yet begun. Accordingly, the battery discharges during a discharging period 112 prior to the start of the power source power output at a second time 114. The energy that is discharged from the battery powers the operations, such as the gas purge 106 and the wire jog 108, which occur before the welding arc power is initiated. That is, presently contemplated embodiments of the hybrid wire feeder enable the weld sequencing to begin without welding power. Indeed, wire run-in and initial gas flow for the welding process may be initiated before welding power is supplied and without the need for the wire feeder to be connected to an alternate power source (e.g., a wall outlet). Additionally, in some embodiments, the battery may be used to power the welding arc in an initial period before the welding power supply resumes control or for limited duty cycle welding.

As illustrated, at the second time 114, the power source begins to output power, as indicated in plot 90. Concurrently, the battery power, as shown in plot 96, exits the discharging period 112 and enters a charging period 116. That is, beginning at the second time 114, the welding arc power provides power for subsequent gas valving and wire feed events. The welding arc power is also used to recharge the battery. At a third time 118, the gun trigger is released, as shown in plot 88, initiating a burn back period 120. During the burn back period 120, the power supply remains active to prevent the wire from being shorted in the weld. Accordingly, the beginning of the burn back period at time 118 begins a period 122 during which the wire feed speed is decreased. Also, since the power source remains activated during the burn back period 120, the battery remains charging until a fourth time 124 when the power source no longer outputs power. At this time 124, the battery enters a second discharging period during which the battery provides power for any desired post-weld operations. In this way, the battery and the welding arc power are both utilized by the hybrid wire feeder to power the welding operation and its associated welding events (e.g., wire jogs, gas purges, etc.).

Figure 4:
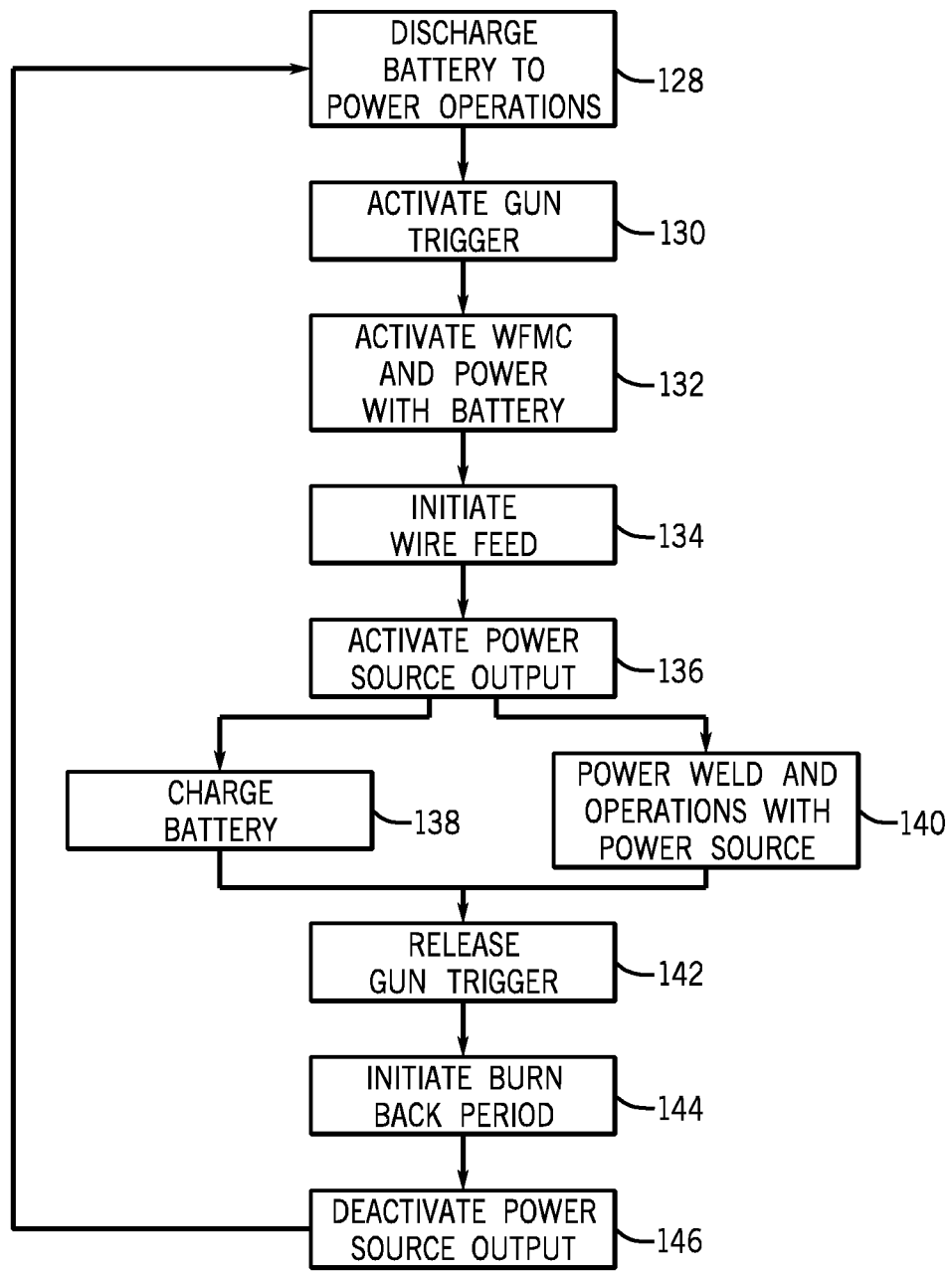
FIG. 4 is a flow chart illustrating an exemplary method of operating a hybrid wire feeder in conjunction with a welding power supply in accordance with aspects of the present invention.

FIG. 4 is a flow chart illustrating an exemplary method of using the hybrid wire feeder 30 of FIGS. 1 and 2. As previously described, the battery discharges to power wire feeder operations (e.g., wire jogs, gas purges, etc.) before and after the actual weld occurs (block 128). When the gun trigger is activated by a user (block 130), the wire feed motor controller is activated and powered by the battery (block 132). The wire feed is then initiated (block 134) and the wire feed ramps up to the desired level. The power source is then activated and begins outputting power (block 136). When the power source is activated, the battery no longer provides power for the wire feed operations, and the battery is charged from the welding arc power (block 138). The welding arc power from the power source is also used to power the weld and wire feeder operations (block 140).

When the welding operator ceases the weld by releasing the gun trigger (block 142), a burn back period is initiated (block 144). During the burn back period, the welding power source continues to power the weld and the wire feeder operations. After the burn back period elapses, the power source is deactivated and ceases to output power (block 146). At this point, the battery exits the charging period and begins to again discharge to power the wire feeder operations (block 128). In this way, the hybrid wire feeder may utilize both the battery and the welding arc power to power the wire feeder operations. Such a hybrid power system may allow for events of the welding process (e.g., wire jog, gas purge, etc.) to begin prior to the initiation of welding power and without the wire feeder being attached to an alternate source of power (e.g., a wall outlet). Additionally, in some embodiments, the battery may even be used to power the welding arc in an initial period before the welding power supply resumes control or in limited duty cycle welding.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a welding power supply comprising a first housing and being configured to provide welding power for a welding operation; and
   a wire feeder comprising a second housing and an energy storage device and a charging circuit disposed in the second housing, wherein:
   when the welding power supply is not providing welding power and the wire feeder is not receiving power from the welding power supply, the wire feeder is configured to utilize power from the energy storage device to power weld sequencing events,
   and when the welding power supply is providing welding power, the wire feeder is configured to utilize the charging circuit to charge the energy storage device with the welding power and to utilize the welding power to power the weld sequencing events.

2. The welding system of claim 1, wherein the weld sequencing events comprise at least one of a wire jog, a wire feed, and a gas purge.

3. The welding system of claim 1, wherein the energy storage device comprises at least one of a battery, a solar cell, a fuel cell, and a capacitor.

4. The welding system of claim 1, wherein the wire feeder comprises gas control valving configured to regulate the flow of gas to a welding torch.

5. The welding system of claim 1, wherein the wire feeder is configured to utilize the energy storage device to power the welding arc when the welding power supply is not providing welding power.

6. The welding system of claim 1, wherein the welding power supply comprises first interface circuitry and the wire feeder comprises second interface circuitry and the first interface circuitry and the second interface circuitry are configured to bidirectionally exchange information regarding the welding operation.

7. The welding system of claim 1, comprising a gas conduit configured to transport gas from a gas cylinder to gas valving located in the wire feeder.

8. A wire feeder, comprising:
   a housing;
   an energy storage device disposed in the housing and configured to provide energy to power one or more weld sequencing events when the wire feeder is not receiving weld power from a welding power source;
   a charging circuit disposed in the housing and coupled to the energy storage device and configured to supply power to the energy storage device from the weld power when the wire feeder is receiving weld power from the welding power source comprising a second housing; and
   a control circuit disposed in the housing and configured to activate discharge of power from the energy storage device when the wire feeder is not receiving weld power from the welding power source and to activate charging of the energy storage device when the wire feeder is receiving power from the welding power source.

9. The wire feeder of claim 8, comprising an interface circuit configured to communicate with an interface circuit of the welding power source to coordinate operation of the wire feeder and the welding power source.

10. The wire feeder of claim 8, wherein the control circuit is further configured to initiate a burn back period, during which the energy storage device is configured to continue charging and the welding power source is configured to continue supplying the weld power, after a gun trigger is released.

11. The wire feeder of claim 10, wherein the control circuit is further configured to deactivate a supply of the weld power from the welding power source immediately after the burn back period.

12. The wire feeder of claim 8, wherein the one or more weld sequencing events comprise at least one of a wire jog, a wire feed, and a gas purge.

13. The wire feeder of claim 8, wherein the energy storage device is further configured to power the welding arc when the wire feeder is not receiving power from a welding power source.

14. The wire feeder of claim 8, wherein the energy storage device comprises at least one of a battery, a solar cell, a fuel cell, and a capacitor.

15. A control circuit for a wire feeder comprising a housing, the control circuit being configured to:
   discharge an energy storage device disposed in the housing to provide energy to power one or more weld sequencing events when a welding power supply comprising a second housing is not providing weld power and the wire feeder is not receiving power from the welding power supply;
   charge the energy storage device with the weld power from the welding power supply when the welding power supply is providing weld power; and
   utilize the weld power to power the one or more weld sequencing events when the welding power supply is providing weld power.

16. The control circuit of claim 15 configured to discharge the energy storage device to power a weld when the welding power supply is not providing weld power.

17. The control circuit of claim 15, wherein the one or more weld sequencing events comprises at least one of a wire jog, a wire feed, and a gas purge.

18. The control circuit of claim 15, wherein the energy storage device comprises at least one of a battery, a solar cell, a fuel cell, and a capacitor.

19. The control circuit of claim 15, configured to initiate a supply of the weld power from the welding power supply in response to activation of a welding gun trigger.

20. The control circuit of claim 19, configured to initiate a burn back period in response to deactivation of the welding gun trigger and to deactivate the supply of the weld power from the welding power supply immediately after the burn back period.

* * * * *